United States Patent [19]

Grothe et al.

[11] Patent Number: 5,088,580
[45] Date of Patent: Feb. 18, 1992

[54] HYDRAULICALLY ACTING DAMPING ELEMENT

[75] Inventors: Manfred Grothe, München; Volker Härtel, Germering, both of Fed. Rep. of Germany

[73] Assignee: Metzeler GmbH, Munich, Fed. Rep. of Germany

[21] Appl. No.: 521,592

[22] Filed: May 10, 1990

[30] Foreign Application Priority Data

May 10, 1989 [DE] Fed. Rep. of Germany ....... 3915311

[51] Int. Cl.$^5$ .................. F16F 9/08; B60G 13/08
[52] U.S. Cl. .................. 188/298; 267/219; 267/140.1 A; 248/568
[58] Field of Search .......... 267/140.1 R, 140.1 A, 267/140.1 C, 219, 35, 34; 248/562, 568, 575, 578, 603, 623, 638; 188/298

[56] References Cited

U.S. PATENT DOCUMENTS

| | | | |
|---|---|---|---|
| 2,942,834 | 6/1960 | Clark | 267/140.1 R |
| 3,128,985 | 4/1964 | Wallerstein | 267/140.1 R |
| 4,262,886 | 4/1981 | Le Salver et al. | 267/140.1 A |
| 4,392,639 | 7/1983 | Konishi | 267/140.1 A |
| 4,458,888 | 7/1984 | Wolf et al. | 267/153 X |
| 4,585,215 | 4/1986 | Kramer | 267/140.1 X |
| 4,690,389 | 9/1987 | West | 248/562 X |
| 4,722,516 | 2/1988 | Gregg | 267/64.27 |
| 4,750,719 | 6/1988 | Härtel | 267/219 |
| 4,886,251 | 12/1989 | Häussermann | 267/219 X |

FOREIGN PATENT DOCUMENTS

3537865 11/1989 Fed. Rep. of Germany.

Primary Examiner—Robert J. Oberleitner
Assistant Examiner—Peter M. Poon
Attorney, Agent, or Firm—Herbert L. Lerner; Laurence A. Greenberg

[57] ABSTRACT

A hydraulically acting damping element includes a main chamber and a compensation chamber. Two rigid end walls and a rubber-elastic circumferential wall surround one of the chambers. An elastic, pressure-stable bellows has ends and a circumference. The bellows is disposed concentrically inside the one chamber and rigidly joined to the end walls with the main chamber inside the bellows and the compensation chamber between the bellows and the circumferential wall. An over-flow circuit is formed on one of the ends of the bellows and extends over at least part of the circumference of the bellows for hydraulically connecting the main chamber and the compensation chamber.

22 Claims, 2 Drawing Sheets

HYDRAULICALLY ACTING DAMPING ELEMENT

The invention relates to a hydraulically acting damping element having a main chamber and a compensation chamber, which communicate hydraulically with one another through an overflow conduit.

Such damping elements are known in principle as hydraulically damping two-chamber engine mounts. The main chamber is generally surrounded by a frustoconical rubber part that is reduced in height upon static or dynamic spring deflection and forces part of the fluid through an overflow conduit disposed in one end well of the main chamber, into a volumetrically elastic compensation chamber during this process. Damping occurs as a result of fluid friction in the overflow conduit.

However, that type of engine mount has great spring rigidity, because of the rigidity of the frustoconical rubber body, so that high damping force is attainable only if the spring rigidity is simultaneously overcome.

It is accordingly an object of the invention to provide a hydraulically acting damping element, which overcomes the hereinafore-mentioned disadvantages of the heretofore-known devices of this general type and which despite having high volumetric rigidity nevertheless has only very slight spring rigidity, so that with such an element, damping can be effected essentially independently of the spring rigidity. This kind of pure damping element should be very simple to manufacture and should be usable alone or along with a spring element of high rigidity.

With the foregoing and other objects in view there is provided, in accordance with the invention, a hydraulically acting damping element, comprising a basic chamber, two rigid end walls and a rubber-elastic circumferential wall surrounding the basic chamber, an elastic, pressure-stable bellows having ends and a circumference, the bellows being disposed concentrically inside the basic chamber and rigidly joined to the end walls defining a main chamber inside the bellows and a compensation chamber between the bellows and the circumferential wall, and an overflow conduit being formed on one of the ends of the bellows and extending over at least part of the circumference of the bellows for hydraulically connecting the main chamber and the compensation chamber.

In such a damping element, the damping action is provided solely by the volumetric rigidity, the geometry of the overflow conduit and the viscosity of the fluid being used, independently of the spring rigidity, which is only very slight in such a damping element.

In accordance with another feature of the invention, the one end of the bellows has a double-walled configuration defining the overflow conduit in the form of a groove with an approximately rectangular cross section bordering one of the end walls, the overflow conduit having an approximately tangential inlet communicating with the main chamber and an approximately tangential outlet communicating with the compensation chamber.

In accordance with a further feature of the invention, the end walls are disk-shaped, are formed of a material from the group consisting of metal and plastic and have surfaces facing toward the chambers with circular-annular clamping grooves formed therein and surfaces facing away from the chambers with force induction elements, such as a screw bolt or a dovetail guide, formed thereon, and the bellows have end surfaces being form-lockingly disposed in the clamping grooves. A form-locking connection is one which connects two elements together due to the shape of the elements themselves, as opposed to a force-locking connection, which locks the elements together by force external to the elements.

In accordance with an added feature of the invention, one of the end walls made of plastic is integrally formed directly onto the bellows.

In accordance with an additional feature of the invention, the circumferential wall is approximately cylindrical and has ends encompassing the end walls, and there are provided clamping rings bracing the circumferential wall against the end walls from outside the circumferential wall.

In accordance with yet another feature of the invention, there is provided an approximately cup-shaped rubber molded part having an approximately cylindrical region forming the circumferential wall and a flat bottom region forming one of the end walls bordering the overflow conduit, the one end wall having a reinforcing part in the form of a circular disk of a material from the group consisting of metal and plastic integrally formed therein, and the clamping grooves being formed in the one end wall.

In accordance with yet a further feature of the invention, the rubber molded part has an annular extension outwardly surrounding the reinforcing part, the reinforcing part has an inner surface with annular grooves formed therein, and the flat bottom region has annular protrusions disposed in the annular grooves.

In order to decouple high-frequency oscillations, additional decoupling elements may be provided in a known manner known. Therefore, in accordance with yet an added feature of the invention, there is provided at least one additional decoupling element for vibrations of predetermined frequencies.

In accordance with yet an additional feature of the invention, one of the end walls bordering the main chamber has a recess formed therein defining an air-filled diaphragm chamber, and at least one decoupling element is a flat rubber diaphragms disposed in the recess between the diaphragm chamber and the main chamber.

In accordance with again another feature of the invention, the bellows has a wall, and the decoupling element includes bores radially penetrating the bellows wall along a circular path, and an elastic rubber band outwardly covering the bores and uncovering the bores like a valve upon a pressure increase.

In accordance with again a further feature of the invention, the ends of the bellows have cylindrical sections in which the bores are formed.

In accordance with again an added feature of the invention, one end of the bellows has inner and outer walls defining the overflow conduit, and the bores are formed in the outer wall.

In accordance with again an additional feature of the invention, there is provided a mechanically acting spring body disposed parallel to the bellows. This is done in order to provide a possibly necessary spring rigidity.

In accordance with still another feature of the invention, the spring body is a metal helical spring which may be fastened inside the bellows between the two end walls.

In accordance with still a further feature of the invention, the bellows is formed of an elastic plastic material from the group consisting of unexpanded polyurethane, polyethylene, elastic polyester and plasticized polyamide.

In accordance with a concomitant feature of the invention, the bellows is formed of an alloy of polypropylene-EPDM or a rubberized woven fabric.

Other features which are considered as characteristic for the invention are set forth in the appended claims.

Although the invention is illustrated and described herein as embodied in a hydraulically acting damping element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
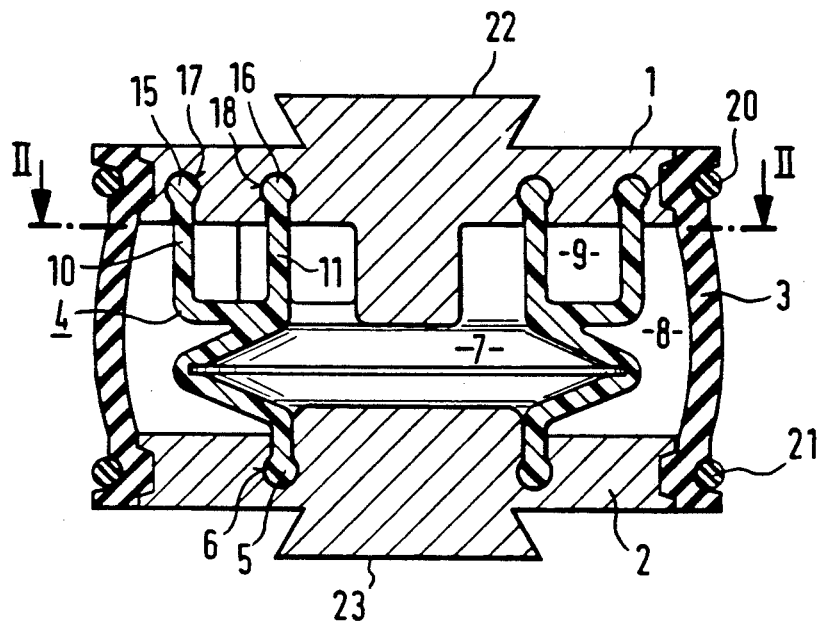
FIG. 1 is a diagrammatic, longitudinal-sectional view of a damping element showing the basic structure thereof.
Figure 2:
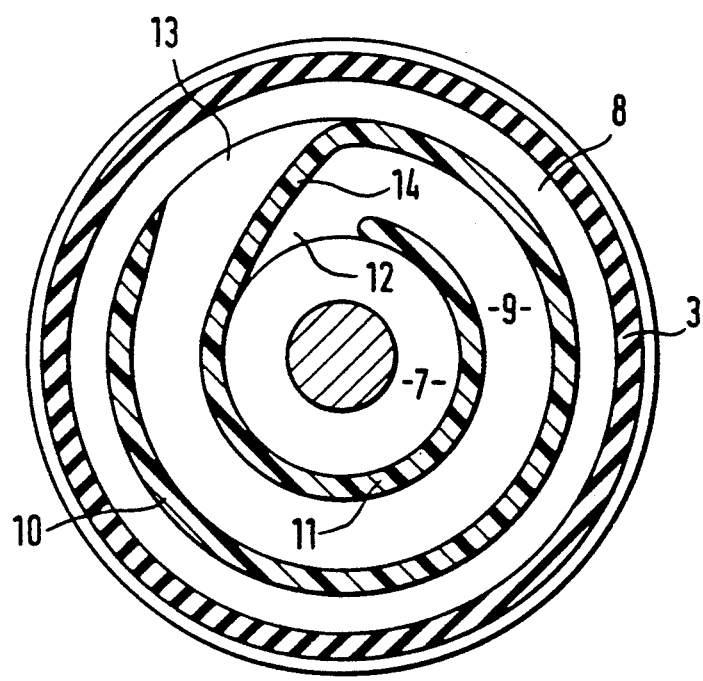
FIG. 2 is a cross-sectional view of the vicinity of the overflow conduit of the damping element, taken along the line II—II of FIG. 1 in the direction of the arrows.

Referring now to the figures of the drawing in detail and first, particularly, to FIGS. 1 and 2 thereof, there is seen a damping element having an upper end wall 1 and a lower end wall 2 of metal or plastic, which are surrounded on the outside thereof by a cylindrical or curved soft-elastic circumferential wall 3 of rubber. The two rigid end walls and rubber-elastic circumferential wall surround a basic chamber. An elastic but pressure-stable bellows 4 which is inserted between the two end walls 1 and 2, in this case is shown in simplified form having only one fold but naturally may have a plurality of folds depending on the embodiment and the required volume. The bellows 4, which is disposed concentrically inside the basic chamber, is produced from elastic plastic, polyethylene, polyester or plasticized polyamide, or of a polypropylene-EPDM alloy by injection molding or blow molding, or from a rubberized woven fabric The lower end of the bellows 4 has an optionally thickened end bead 5 which is clampingly inserted into a correspondingly encompassing groove 6 in the lower end wall 2.

The bellows 4 encloses a main chamber 7 of the damping element, while a compensation chamber 8 is formed between the bellows 4 and the outer circumferential wall 3. The two chambers 7 and 8 communicate with one another through an overflow conduit 9, which is formed directly onto the upper end of the bellows 4. Through the use of a double-walled configuration 10 and 11, a practically U-shaped groove is created, which is closed off at the top by the end wall 1 and thus forms the overflow conduit 9.

As can be seen concerning this structure from the cross section of FIG. 2, the conduit 9 has an inlet 12 that is cut free toward the main chamber 7 and an outlet 13 that is cut free toward the compensation chamber 8. The inlet 12 and the outlet 13 are streamlined as a result of the fact that the outer wall 10 is guided inward in the form of a flow baffle 14 and merges with the inner wall 11 in the region between the outlet and the inlet, while extending at a flat angle of approximately 30-40 relative to the tangent of the outer and inner walls.

The upper end surface of the bellows 4, which is formed by the two conduit walls 10 and 11, is clamped in the same manner through the use of bead-like thickened portions or ends 15 and 16 in corresponding grooves 17 and 18 formed in the inner surface of the end wall 1.

In order to provide fluid-tight securing, the outer circumferential wall 3 can also be braced against the upper and lower end walls 1 and 2 through respective clamping or tightening rings 20 and 21 in an airtight and fluid-tight manner. In order to secure the damping element, suitable force induction elements, for example in the form of dovetail guides 22 and 23, can also be formed directly onto the end walls 1 and 2.

Upon compression of the damping element, fluid is pumped out of the bellows-like main chamber 7 through the overflow conduit 9 into the compensation chamber 8, while upon relief or expansion of the element, the fluid is forced back from the outer compensation chamber 8 into the main chamber 7 in the interior of the bellows 4.

During this flow through the overflow conduit 9, the desired damping which occurs is largely independent of the spring rigidity of the damping element, because this spring rigidity is very slight and is determined only by the relatively soft outer circumferential wall 3 and the axial stability of the bellows 4. This means that the damping of such an element is practically solely determined by the geometry of the overflow conduit 9 and the viscosity of the fluid being used.

Figure 3:
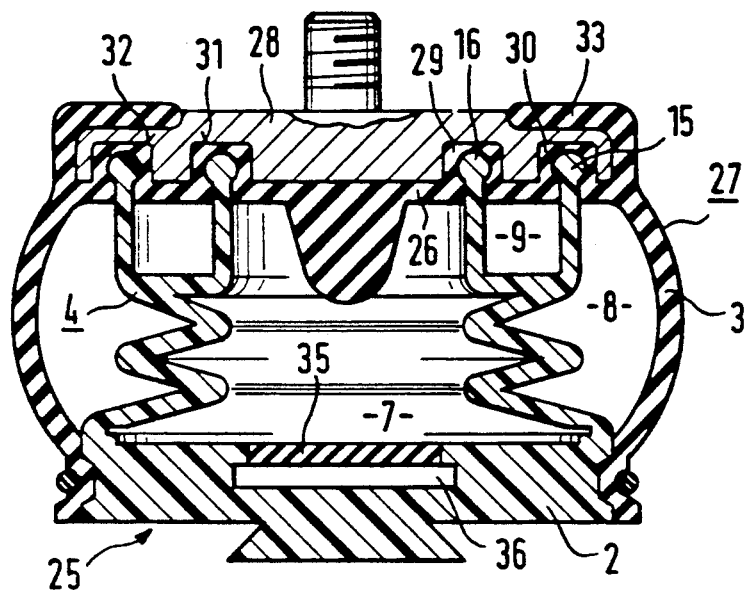
FIG. 3 is a view similar to FIG. 1 of another embodiment of a damping element.

A further structural option for such a damping element is shown in FIG. 3. In this case, the bellows 4 and the lower end wall 2 are first constructed as a one-piece integral element 25. In other words, the end wall 2 is formed directly onto the bellows 4. Moreover, the circumferential wall 3 and an upper, inner end wall 26, which forms the limitation of the overflow conduit 9, are constructed as a one-piece rubber molded part 27, into which only a solid end wall part or reinforcement plate 28 of metal, synthetic or plastic is clipped as a reinforcement. The elements 26 and 28 together can be considered to form the upper end wall.

The end wall 26 of the rubber molded part 27 has annular protrusions 29 and 30, in which corresponding grooves for receiving the bead-like ends 15 and 16 of the bellows are formed. In order to hold and reliably support these protrusions 29 and 30, the reinforcement plate 28 has corresponding grooves 31 and 32 formed therein. In order to provide secure retention, the outer edge of the reinforcement plate 28 is also encompassed by an annular extension 33 of the rubber molded part 27. Additionally, a non-illustrated outer clamping ring may also be provided.

The damping element shown in FIG. 3 can thus be made very simply as a two-part component, having a first part in the form of the plastic part 25 with the lower end wall 2 and the bellows 4 with the formed-on overflow conduit 9, and having a second part in the form of the rubber molded part 27 with the circumferential wall 3 and the upper end wall 26. The rubber molded part 27 can, for instance, be injected and vulcanized directly onto the reinforcement plate 28 placed in an injection mold.

Naturally, other structures and optional combinations are possible besides those shown in FIGS. 1 and 3. For instance, the molded part 25 of FIG. 3 can be combined with the upper end plate 1 and the circumferential wall 3 of FIG. 1, or the molded part 27 and the reinforcement plate 28 of FIG. 1 can be combined with the end wall 2 and the bellows 4 of FIG. 1.

In order to decouple certain frequencies, such a damping element can additionally be provided with decoupling elements. This can be accomplished in accordance with FIG. 3 through the use of a rubber diaphragm 35 in the form of a circular disk, which is disposed on the surface of the end wall 2 in the main chamber 7. The rubber diaphragm 35 closes off an air-filled diaphragm chamber 36 located behind it, so that when vibrations of a certain frequency and amplitude are induced, it resonates with them and in this way decouples such vibrations.

Figure 4:
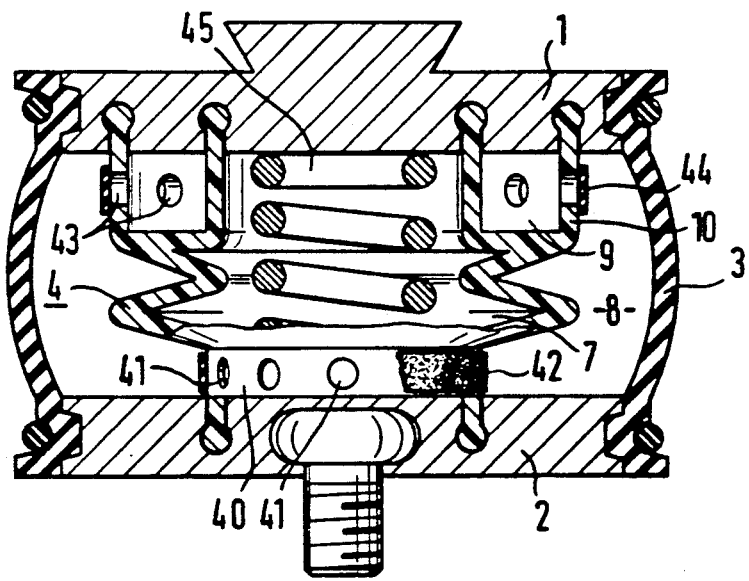
FIG. 4 is view similar to FIG. 1 of a damping element having additional decoupling elements and elements for increasing spring rigidity.

A further option for decoupling is shown in the exemplary embodiment of FIG. 4. In this case, radial bores 41 are provided in a cylindrical lower portion 40 of the bellows 4 and are outwardly covered by an encompassing elastic rubber band 42. Upon sudden pressure surges, the rubber band 42 can uncover the bores 41 like a valve, so that fluid can correspondingly flow out, bypassing the actual overflow conduit 9.

However, in order to provide a corresponding effect, bores 43 can also be formed in the outer wall 10 of the overflow conduit 9 and can be closed by a corresponding rubber band 4.

As already mentioned, a corresponding damping element has only very low spring rigidity and thus exhibits damping that is practically independent of the spring rigidity. It is possible to use such a damping element alone for vibration damping, or in parallel with elements of high spring rigidity. Optionally, such a damping element can have high spring rigidity integrated directly with it, for instance as shown in FIG. 4, by placing a cylindrical helical spring 45 inside the main chamber 7 between the upper end wall 1 and the lower end wall 2. In this way, a requisite initial rigidity of the damping element can be achieved in a simple manner.

The overall result is a damping element that is simple to produce, particularly small in size, and has a very low spring rigidity despite a high volumetric rigidity, so that the damping action is provided solely by volumetric rigidity, geometry of the overflow conduit and viscosity of the fluid being used.

We claim

1. Hydraulically acting damping element, comprising two rigid end walls and a rubber-elastic circumferential load bearing wall defining a main chamber between said rigid end walls, a compensate chamber being disposed coaxially within said main chamber and being defined by an elastic separating wall rigidly joined to said end walls separating said main chamber from said compensation chamber, said separating wall being in the form of a pressure-stable bellows having ends and a circumference, and an overflow conduit fluidically connecting said chambers and being formed on one of said ends of said bellows and forming a part of said bellows.

2. Damping element according to claim 1, wherein said one end of said bellows has a double-walled configuration defining said overflow conduit in the form of a groove with an approximately rectangular cross section bordering one of said end walls, said overflow conduit having an approximately tangential inlet communicating with said main chamber and an approximately tangential outlet communicating with said compensation chamber.

3. Damping element according to claim 1, wherein said end walls are disk-shaped, are formed of a material from the group consisting of metal and plastic and have surfaces facing toward said chambers with circular-annular clamping grooves formed therein and surfaces facing away from said chambers with formed induction elements formed thereon, and said bellows have end surfaces locked in said clamping grooves.

4. Damping element according to claim 3, wherein one of said end walls is formed directly and integrally onto said bellows.

5. Damping element according to claim 4, including an approximately cup-shaped rubber molded part having an approximately cylindrical region forming said circumferential wall and a flat bottom region forming one of said end walls bordering said overflow conduit, said one end wall having a reinforcing part in the form of a circular disk of a material from the group consisting of metal and plastic integrally formed therein, and said clamping grooves being formed in said one end wall.

6. Damping element according to claim 5, wherein said rubber molded part has an annular extension outwardly surrounding said reinforcing part, said reinforcing part has an inner surface with annular grooves formed therein, and said flat bottom region has annular protrusions disposed in said annular grooves.

7. Damping element according to claim 4, wherein said circumferential wall is approximately cylindrical and has ends encompassing said end walls, and including clamping rings bracing said circumferential wall against said end walls from outside said circumferential wall.

8. Damping element according to claim 3, wherein said circumferential wall is approximately cylindrical and has ends encompassing said end walls, and including clamping rings bracing said circumferential wall against said end walls from outside said circumferential wall.

9. Damping element according to claim 3, including an approximately cup-shaped rubber molded part having an approximately cylindrical region forming said circumferential wall and a flat bottom region forming one of said end walls bordering said overflow conduit, said one end wall having a reinforcing part in the form of a circular disk of a material from the group consisting of metal and plastic integrally formed therein, and said clamping grooves being formed in said one end wall.

10. Damping element according to claim 9, wherein said rubber molded part has an annular extension outwardly surrounding said reinforcing part, said reinforcing part has an inner surface with annular grooves formed therein, and said flat bottom region has annular protrusions disposed in said annular grooves.

11. Damping element according to claim 1, wherein said bellows is formed of a rubberized woven fabric.

12. Damping element according to claim 1, wherein said bellows is formed of a polypropylene-EPDM alloy.

13. Damping element according to claim 1, wherein said bellows is formed of an elastic plastic material from the group consisting of unexpanded polyurethane, polyethylene and plasticized polyamide.

14. Damping element according to claim 1, including a mechanically acting spring body disposed parallel to said bellows.

15. Damping element according to claim 14, wherein said spring body is a metal helical spring.

16. Damping element according to claim 14, wherein said spring body is fastened inside said bellows between said two end walls.

17. Damping element according to claim 1, including at least one decoupling element for vibrations of predetermined frequencies.

18. Damping element according to claim 17, wherein said one end of said bellows has inner and outer walls defining said overflow conduit, and said bores are formed in said outer wall.

19. Damping element according to claim 17, wherein one of said end walls bordering said main chamber has a recess formed therein defining an air-filled diaphragm chamber, and said at least one decoupling element is a flat rubber diaphragm disposed in said recess between said diaphragm chamber and said main chamber.

20. Damping element according to claim 17, wherein said bellows has a wall, and said at least one decoupling element includes bores radially penetrating said bellows wall along a circular path, and an elastic rubber band outwardly covering said bores and uncovering said bores like a valve upon a pressure increase.

21. Damping element according to claim 20, wherein said ends of said bellows have cylindrical sections in which said bores are formed.

22. Hydraulically acting damping element, comprising two rigid end walls, a rubber-elastic circumferential load bearing wall defining a main chamber between said end walls, an elastic, pressure-stable bellows having ends and a circumference, said bellows being disposed coaxially within said main chamber and being rigidly joined to said end walls defining a compensation chamber between said bellows and said circumferential wall, and an overflow conduit being formed on one of said ends of said bellows and extending over at least part of the circumference of said bellows for hydraulically connecting said main chamber and said compensation chamber.

* * * * *